Dec. 5, 1950 D. L. HINGS 2,532,451
RADIO FREQUENCY INVERTER RELAY CIRCUIT
Filed March 20, 1946
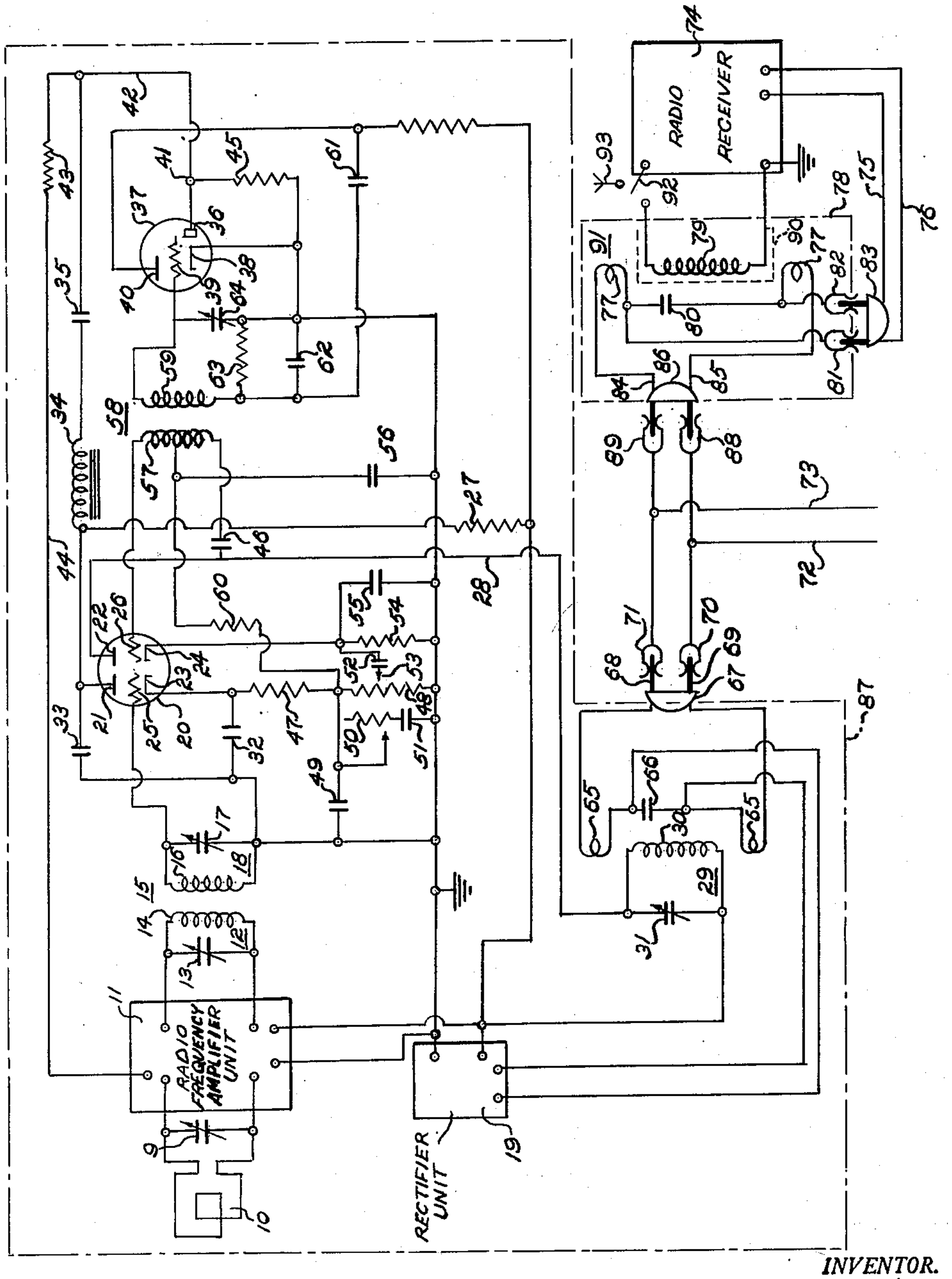
INVENTOR.
Donald L. Hings
BY
Woodling and Krost
attys.

Patented Dec. 5, 1950

2,532,451

UNITED STATES PATENT OFFICE 2,532,451

RADIO-FREQUENCY INVERTER RELAY CIRCUIT

Donald L. Hings, Vancouver, British Columbia, Canada, assignor, by mesne assignments, to Cornell-Dubilier Electric Corporation, South Plainfield, N. J., a corporation of Delaware Application March 20, 1946, Serial No. 655,692

9 Claims. (Cl. 250—15)

My invention relates in general to radio frequency relay inverter circuits and more particularly to radio frequency relay inverter circuits adapted to generate a secondary modulated carrier wave, which is the inverse to an original modulated carrier wave.

An object of my invention is to convert radio frequency energy of a predetermined frequency into a second frequency, in which the modulated amplitude of the second frequency is inversely proportioned to the modulated amplitude of the frequency of the first source.

Another object of my invention is to provide for taking a modulated radio frequency source and detecting from such source the modulated wave and then inverting the modulated wave and impressing it upon a second frequency source, whereby the output produces a second radio frequency source having a frequency different from that of the first source and with the modulated wave of the second source inversely proportioned to the modulated wave of that appearing in the first source.

Another object is the provision in my circuit to permit the second carrier wave to follow the mean amplitude of the first carrier wave source.

Another object of my invention is to permit relaying radio frequency energy from the first radio frequency circuit to the second radio frequency circuit and reject spurious wave energies that are picked up with the first radio frequency circuit from being retransmitted by the second radio frequency circuit.

Another object of my invention is to step-down the voltage of the secondary inverted modulated radio frequency circuit, which is free of spurious energy, and feed the low voltage energy into a low impedance line, for example a power transmission line or wiring circuit and then step up the radio frequency voltage to a higher value which may be employed as input energy into a radio receiver located at some remote point from the secondary inverted modulated radio frequency circuit which functions as a remote control circuit.

Another object of my invention is to prevent interference common to transmission lines and wiring circuit from being received by filtering out electrostatic energy noises carried on the lines by means of a shield connected to ground and surrounding the step-up winding.

Other objects and a fuller understanding of my invention can be had by referring to the following description and claims taken in conjunction with the single figure on a diagrammatic illustration of my invention.

With reference to the figure of the drawing, the reference character 10 represents a loop aerial which is connected to a radio frequency amplifier unit, designated by the reference character 11. The radio frequency amplifier unit may be tuned by a variable capacitor 9 whereby the selection of frequency is permitted, such for example as tuning in to a certain radio broadcasting station. The output of the radio frequency amplifier unit is conducted to a tuned output circuit, designated by the reference character 12, and comprising an inductance element 14 and a variable capacitor 13. The inductance element 14 constitutes a primary winding of a step-down transformer 15 having a secondary winding 16 with a variable capacitor 17 connected thereacross to form a tuned circuit 18. The modulated radio frequency energy appearing in the transformer 15 will be sometimes referred to as a first modulated radio frequency carrier wave source.

The first operation performed in my circuit is to detect the modulated radio frequency energy appearing in the transformer 15, and I employ one set of electrode elements of a twin triode tube 20 to perform this detection operation. The twin triode tube 20 comprises a first set of electrodes comprising a cathode 23, a plate 21 and a grid 25. The second set of electrodes mounted within the twin triode tube 20 comprises a plate 22, a cathode 24 and a grid 26. The set of electrodes comprising the cathode 23, the plate 21 and the grid 25 comprises the detector elements for detecting the modulation appearing in the radio frequency transformer 15. For detecting the modulated wave, the grid 25 is connected to the upper or high impedance end of the transformer secondary winding 16 and the cathode 23 is connected to the lower or low impedance end of the secondary winding 16 through a radio frequency by-pass capacitor 32. The capacitor 33 which is connected to the plate 21 has its opposite terminal connected to ground and thus operates as a capacitance impedance matching device for the plate circuit of the detector. The radio frequency energy from the plate 21 is employed in my circuit for providing the energy for automatic volume control of the circuit. The circuit which I employ as part of the automatic volume control includes an inductance element 34 which is connected through a plate blocking condenser 35 to a diode element 36 in a diode triode tube 37. The resistor 27 which is connected to the plate 21 is an isolating resistor and isolates the plate for radio frequency potentials. The diode element 36 and the cathode element 38 represent a low capacitance to the circuit which is in series with the inductance element 34. Thus, the inductance element 34 and the capacitance between the diode element 36 and the cathode 38 represents a series resonant circuit and is also a radio frequency output circuit from the plate 21 of the tube 20. The diode element 36 and the cathode 38 operate as a rectifier to produce negative potential at the terminal 41, which supplies energy back to the radio frequency amplifier unit 11 through a conductor 42, a resistor 43 and a conductor 44. The resistor 45 produces the voltage drop from the rectified energy across the diode element 36 and the cathode 38. The diode element 36 and the cathode element 38 produce a variable voltage across the resistor 45 to compensate for variations in the incoming signal. Thus in the event that the incoming signal is weak, the automatic volume control circuit, as controlled by the diode element 36 receiving radio frequency energy from the plate 21 of the tube 20, operates to increase the amount of controlled energy fed back to the radio frequency amplifier unit which in turn increases the output energy thereof. When the output of the radio frequency amplifier unit becomes too strong, then my automatic volume control circuit functions to reduce the output of the radio frequency amplifier unit. The automatic volume control circuit just described is substantially the same as that shown and described in my pending application, Serial No. 609,264, filed August 6, 1945, and entitled Detector Fed Automatic Volume Control.

The radio frequency energy for the automatic volume control is produced from the plate circuit of the detector electrodes in the tube 20, whereas the modulated wave is taken off the cathode of the detector electrodes. Inasmuch as I employ a series resonant circuit connected to the plate 21 and inasmuch as I connect the plate 21 through a low impedance capacitor 33 to ground, my circuit is suitable for infinite impedance type detection. In other words, by keeping the impedance between the plate 21 and ground to a relatively low value, there is no tendency for my automatic volume control circuit to influence the control grid 25 by inter-electrode capacity.

The detected modulated wave appears between the cathode 23 and ground; namely, in the radio frequency filter resistor 47 and the volume control resistor 48. A capacitor 49 is connected between the lower end of the resistor 47 and ground. Consequently, the capacitor 49 and the capacitor 32, in combination with the radio frequency resistor 47, constitute the radio frequency filter to ground. A variable resistor 50 and capacitor 51 are connected between the lower end of the filter resistor 47 and ground and may be employed as a tone control unit. The energy appearing in the volume control resistor 48 is substantially all detected modulated energy since the radio frequency has been filtered out. The cathode 24 of the twin triode tube 20 is connected through a capacitor 52 and an adjustable pointer 53 to the volume control resistor 48, which enables me to regulate the amount of detected modulated energy fed to the cathode 24. The cathode 24 is connected to ground through a cathode load resistor 54, which is shunted by a high frequency by-pass condenser 55. The cathode 24 of the tube 20 swings in response to the detected modulated energy from the detector circuit. The grid 26 of the tube 20 is connected to ground for modulation frequency through a low frequency capacitor 56, which is connected to the center tap of the secondary winding 57 of a radio frequency transformer 58. A second circuit for the grid 26 of the tube 20 also passes through an isolating resistor 60 which interconnects the center tap of the transformer 58 to the lower end of the radio frequency filter resistor 47. By connecting the isolating resistor 60 to the lower end of the radio frequency filter resistor 47, the grid will follow the mean of the carrier of the first radio frequency source. The amplification of the amplifying elements of the tube 20 comprising the cathode 24, the grid 26 and the plate 22, will provide an amplification which will follow a mean of the carrier energy appearing in the first source or in the transformer 15.

The lower end of the secondary winding 57 of the transformer 58 is connected through a radio frequency capacitor 46 to the plate 22 and the upper end is connected to the grid 26. The primary winding 59 of the transformer is connected to the diode triode tube 37 which operates for producing a second source of radio frequency energy for exciting the grid 26. Any suitable oscillating circuit may be employed for producing the second source of radio frequency energy and as illustrated, I connect the grid 39 to the upper end of the primary winding 59 of the transformer 58. The plate 40 is connected to the lower end of the primary winding 59 through a capacitor 61. The cathode 38 is connected intermediate the capacitor 61 and the lower end of the primary winding 59 by means of a capacitor 62. A grid load resistor 63 connects the grid 39 to the cathode 38 through a circuit including the primary winding 59. A tuning condenser 64 is connected across the primary winding and also in series with the fixed or feed-back capacitor 62 for tuning the primary circuit of the transformer 58 at a selected radio frequency. The energy from the oscillator circuit of the diode triode tube 38 is transferred through the transformer 58 for exciting the grid 26 of the tube 20 at a radio frequency which is the same as the radio frequency from the oscillator. It is to be noted that the cathode 24 of the tube 20 swings at a low frequency, namely at the frequency of the modulated detected energy from the first source appearing in the transformer 15. The radio-frequency by-pass capacitor 55 prevents the cathode 24 from swinging at the frequency of the oscillator. Accordingly, the energy appearing on the plate 22 of the tube 20 comprises both radio frequency from the oscillator circuit of the tube 37 and a low frequency which is the inverse modulated frequency from the detector circuit. Accordingly, my invention provides for producing a secondary modulated carrier wave in the plate circuit 22 of the tube 20 which modulation component is inverse to the primary modulated carrier wave in the transformer 15. The secondary modulated carrier wave is substantially free of spurious radio interference waves. When a spurious interference wave is received by my circuit, then the amplifier elements of the tube 20, namely the cathode 24, the grid 26 and the plate 22 operate to limit the amplitude of the spurious wave energy. During the process of limiting the amplitude of the spurious energy, the grid 25 is biased highly positive with the result that the current momentarily increases through the load and biasing resistor 54 with the result that the bias between the cathode 24 and the grid 26 increases to a point of cut off for the cathode-to-plate circuit 24—22 and thereby limits the value of the spurious interference waves. It is to be noted that the limited spurious interference waves produce, so to speak, a slot or depression in the resultant secondary modulated inversed carrier wave in the cathode-to-plate circuit of the tube 20. In actual operation, from the standpoint of reception, the slots or depressions in the inverse envelope do not make an appreciable noise disturbance to distort the intelligence. Thus in my invention, the spurious wave energy as found in ordinary receptions is limited and inverted so that the intelligence controls the noise instead of the noise controlling the intelligence. My present invention produces a secondary modulated carrier wave, which modulation is inverse to the primary modulated carrier wave, and is related to my pending application filed August 6, 1945, Serial No. 609,263 for Amplifier Wave Inverter.

The energy from the plate 22 is fed through a conductor 28 into an output tuned circuit indicated by the reference character 29 which comprises a transformer winding 30 and an adjustable capacitor 31. It is to be noted that in my circuit I provide for taking modulated radio frequency from a first source and detecting the modulated energy therefrom, in which the detected energy is employed to swing the cathode 24 of a modulating amplifier in combination with the grid 26 which is excited from a second source of radio frequency, whereby the resultant action produces a second source of radio frequency having modulated energy appearing therein, which is inverse of the modulated energy appearing in the first source.

The transformer 30 which has the second radio frequency therein, together with the inverted modulated energy is stepped down to a lower voltage. The lower voltage appears in the transformer secondary windings 65 which have their inner or second ends connected together by a capacitor 66 for radio frequency. The outer or first ends of the secondary windings 65 are connected to a plug 67 having two male terminals 68 and 69. The male terminals may be plugged into a plug receptacle comprising female terminals 70 and 71, of a power transmission line, such for example as a house wiring circuit energized by supply conductors 72 and 73 of a power supply.

The radio frequency amplifier unit 11 may be supplied with electric power from a rectifier unit 11 which has lead wires connected across the capacitor 66 and energized by the power or wiring circuit 72 and 73. All of the equipment which has been described so far may be referred to as a remote control circuit and may be mounted in a portable box indicated by the dash-dot line 87. The radio frequency relay inverter circuit which I have described may be employed to control a radio receiver 74 which may be located at a remote point.

At the radio receiver, 74, I provide a step-up transformer 91 comprising primary windings 77 connected to the power wiring circuit and a secondary winding 79 connected to the radio receiver 74. The two inner or second ends of the primary windings 77 are connected together by a capacitor 80. The step-up unit may be mounted in a housing indicated by the dash-dot line 78, in which are mounted female receptacles 81 and 82. A male plug 83 connected by conductors 75 and 76 to the radio receiver 74 may be plugged into the female receptacles 81 and 82. The outer or first ends of the secondary windings 77 of the step-up transformer unit have extending therefrom two conductors 84 and 85 with a male plug 86 on the end thereof. The male plug 86 may be plugged into a female receptacle comprising female terminals 88 and 89 of the house wiring circuit. The radio frequency energy from the step-down transformer 30 is transmitted through the house wiring circuit, or other power transmission line to a remote point where the step-up transformer unit located at the radio receiver, steps up the energy for use by the radio receiver. The energy which appears in the step-down transformer 30 is free of spurious radio interference waves and thus this noise free energy is fed in the house wiring circuit. The electrostatic energy which is normally found in house wiring circuits is filtered out by means of an electrostatic shield 90 which surrounds the transformer winding 79, and which is connected to ground as illustrated in the drawing.

The radio frequency relay inverter circuit may be mounted in the portable housing as indicated by the dash-dot line 87 and may be plugged into the house wiring circuit in one location in the home which is at a remote place from where the radio receiver is plugged into the house wiring circuit and may be used to remotely control the receiver. The phase of the present invention which deals with the remote control of the receiver by transmitting radio frequency energy over power transmission lines or lighting circuits relates to my pending application Serial No. 653,734, filed March 12, 1946, now abandoned, entitled Radio Frequency Relay Circuit.

To connect the radio receiver to the radio frequency relay inverter circuit, the switch 92 is connected to the secondary winding 79 of the transformer 91 which disconnects the antenna 93. In operation, the operator tunes, or selects the station that is desired to be received by tuning the loop circuit, for example, by capacitor 9 and the control of the radio frequency inverter circuit which is located at some remote point from the radio receiver 74 thus controls the radio receiver. Should the incoming signal be weak, then the automatic volume control circuit operates to increase the output of the first radio frequency amplifier unit to provide more energy on the transformer 15. The bias on the grid 26 is shifted in accordance with the mean power or energy appearing in the first radio frequency source, namely, the transformer 15, with the result that the energy supplied to the output transformer 30 follows the mean power of the first radio frequency source. The resistor 60, which is connected to the bottom of the resistor 47, shifts the bias of grid 26 in accordance with the mean detected modulated energy of the detector circuit. Therefore, the output carrier of the oscillator circuit will follow the input carrier and the percentage of modulation will remain about the same. Let us assume that the carrier of the first source is weak and the noise peaks become excessive. Under this condition the detection of the noise peaks tends to swing the cathode 24 more positive, and tends to cut off any of the noise energy from being amplified, and as this carrier is small, the amplification of the tube will be relatively small. Therefore, the excessive noise peaks will be reduced in amplitude by the fact that there is less carrier to cut-off. The radio frequency, which is amplified through amplifying elements 24, 26 and 22 is kept in proportion to the modulation of the incoming energy.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A radio frequency system comprising, in combination, a primary modulated carrier wave source, a secondary carrier wave source having a frequency different from the frequency of the primary carrier wave source, means for detecting the modulated energy wave of the primary modulated carrier wave source, an amplifier circuit including an amplifier tube having a cathode, a plate, and a grid, a biasing element through which the detected modulated energy wave flows, means for connecting the biasing element to the cathode, means for exciting the grid from the secondary carrier wave source, an output circuit connected to the plate having energy appearing therein which comprises both radio frequency from the secondary carrier wave source and a low frequency which is inverse to the modulated wave of the primary modulated carrier wave source, and means for also connecting the grid to the biasing element whereby the output energy in the output circuit varies in time in sympathy with the energy of the primary carrier wave source.

2. A radio frequency system comprising, in combination, a primary modulated carrier wave source, a secondary carrier wave source having a frequency different from the frequency of the primary carrier wave source, means for detecting the modulated energy wave of the primary modulated carrier wave source, an amplifier circuit including an amplifier tube having a cathode, a plate, and a grid, a biasing element through which the detected modulated energy wave flows, means for connecting the biasing element to the cathode, means for exciting the grid from the secondary carrier wave source, an output circuit connected to the plate having energy appearing therein which comprises both radio frequency from the secondary carrier wave source and a low frequency which is inverse to the modulated wave of the primary modulated carrier wave source, and means for causing the grid to be affected by the energy in the primary carrier wave source.

3. A radio frequency system comprising in combination, a primary modulated carrier wave source, a secondary carrier wave source having a frequency different from the frequency of the primary carrier wave source, means for detecting the modulated energy wave of the primary modulated carrier wave source, an amplifier circuit including an amplifier tube having a cathode, a plate, and a grid, a biasing element through which the detected modulated energy wave flows, means for connecting the biasing element to the cathode, means for exciting the grid from the secondary carrier wave source, an ouput circuit connected to the plate having energy appearing therein which comprises both radio frequency from the secondary carrier wave source and a low frequency which is the inverse of the modulated frequency from the primary modulated carrier wave source, means for causing the grid to be affected by the energy in the primary carrier wave source, power conductors for supplying power to said system, a step-down transformer for stepping down the voltage of the output circuit, connection means for connecting the power conductors to the step-down transformer, a step-up transformer connected to the power conductors for stepping up the radio frequency voltage transmitted by the power conductors, and a radio receiver responsive to the energy in said step-up transformer.

4. A radio frequency system comprising, a remote control circuit, a radio receiver, transmission conductors having a low impedance, a relay circuit including the transmission conductors interconnecting the remote control circuit and the radio receiver, said remote control circuit comprising a primary modulated carrier wave source and a secondary carrier wave source having a frequency of a different value than that of the primary modulated carrier wave source, an output circuit, and means responsive to both of said carrier wave sources for producing in the output circuit radio frequency energy having a radio frequency substantially the same as that of the secondary carrier wave source and having a modulated wave which is inverse to the modulated wave of the primary carrier wave source, and circuit means for connecting the output circuit to the transmission conductors.

5. A radio reception system comprising a first source of modulated carrier waves, a second source of carrier waves, first and second triodes each having a cathode, an anode and a control grid, means for applying said first carrier wave to the cathode-grid path of said first triode, means for applying said second carrier wave to the cathode-grid path of said second triode, means for obtaining an automatic gain control voltage from the anode of said first triode, means for utilizing said automatic gain control voltage to control the amplitude of said first carrier wave, output circuit means connected to said anode of said second triode, and a common impedance for said cathodes in said cathode-grid paths to produce in said output circuit means a carrier wave at said second carrier frequency having a modulation component inverse to that applied to said grid of said first triode.

6. A radio reception system comprising a first source of modulated carrier waves, a second source of carrier waves, first and second triodes each having a cathode, an anode and a control grid, means for applying said first carrier wave to the cathode-grid path of said first triode, means for applying said second carrier wave to the cathode-grid path of said second triode, means for obtaining an automatic gain control voltage from the anode of said first triode, means for utilizing said automatic gain control voltage to control the amplitude of said first carrier wave, output circuit means connected to said anode of said second triode, a common impedance for said cathodes in said cathode-grid paths to produce in said output circuit means a carrier wave at said second carrier frequency having a modulation component inverse to that applied to said grid of said first triode, a radio receiver, transmission conductors having a low impedance, and a relay circuit including the transmission conductors interconnecting the output circuit means and the radio receiver.

7. A radio reception system comprising, a primary modulated carrier wave source, a secondary carrier wave source having a different frequency than said modulated carrier wave, two thermionic tubes, each having an anode, a cathode and a control electrode, said cathodes being electrically connected together for modulation frequencies, impedance means common to the control electrode-cathode paths and anode-cathode paths of said tubes, means for impressing said modulated carrier wave on the control electrode-cathode path of one of said tubes, means for impressing said secondary carrier wave on the control electrode-cathode path of the other of said tubes, output circuit means connected in the anode-cathode path of at least one of said tubes, and carrier wave bypass means for said modulated carrier wave shunted across said impedance means.

8. A radio reception system comprising, a primary modulated carrier wave source, a secondary carrier wave source having a different frequency than said modulated carrier wave, two thermionic tubes, each having an anode, a cathode and a control electrode, said cathodes being electrically connected together for modulation frequencies, impedance means common to the control electrode-cathode paths and anode-cathode paths of said tubes, means for impressing said modulated carrier wave on the control electrode-cathode path of the first of said tubes, means for impressing said secondary carrier wave on the control electrode-cathode path of the second of said tubes, output circuit means connected in the anode-cathode path of at least one of said tubes, carrier wave bypass means for said modulated carrier wave shunted across said impedance means, gain control means for regulating the amplitude of said primary modulated carrier wave, said gain control means obtaining energy from the anode of said first tube.

9. A radio reception system comprising, a primary modulated carrier wave source, a secondary carrier wave source having a different frequency than said modulated carrier wave, two thermionic tubes, each having an anode, a cathode and a control electrode, said cathodes being electrically connected together for modulation frequencies, impedance means common to the control electrode-cathode paths and anode-cathode paths of said tubes, means for impressing said modulated carrier wave on the control electrode-cathode path of the first of said tubes, means for impressing said secondary carrier wave on the control electrode-cathode path of the second of said tubes, output circuit means connected in the anode-cathode path of at least one of said tubes, carrier wave bypass means for said modulated carrier wave shunted across said impedance means, gain control means for regulating the amplitude of said primary modulated carrier wave, said gain control means obtaining energy from the anode of said first tube, a radio receiver, transmission conductors having a low impedance, and a relay circuit including the transmission conductors interconnecting the output circuit means and the radio receiver.

DONALD L. HINGS.

REFERENCES CITED

The following references are of record in the file of this patent:

UNITED STATES PATENTS

| Number | Name | Date |
|---|---|---|
| 1,688,036 | Clement | Oct. 16, 1928 |
| 1,840,013 | Benson | Jan. 5, 1932 |
| 2,008,279 | Hopkins | July 16, 1935 |
| 2,151,884 | Arendt et al. | Mar. 28, 1939 |
| 2,189,310 | Curtis | Feb. 6, 1940 |
| 2,222,761 | Beizer et al. | Nov. 26, 1940 |
| 2,268,812 | Foster et al. | Jan. 6, 1942 |
| 2,276,565 | Crosby | Mar. 17, 1942 |
| 2,431,471 | Ferguson | Nov. 25, 1947 |
| 2,432,720 | Brown | Dec. 16, 1947 |